United States Patent
Hegarty et al.

(10) Patent No.: US 6,892,878 B2
(45) Date of Patent: May 17, 2005

(54) CASE FOR HOLDING A DISC-SHAPED ARTICLE

(75) Inventors: John Hegarty, Dublin (IE); Brendan Farrell, Kilmacanogue (IE); Katharina Pfutzner, Dublin (IE); Dominic Southgate, Nass (IE)

(73) Assignee: Dualbox Limited, Shankill (IE)

( * ) Notice: Subject to any disclaimer, the term of this patent is extended or adjusted under 35 U.S.C. 154(b) by 0 days.

(21) Appl. No.: 10/793,831

(22) Filed: Mar. 8, 2004

(65) Prior Publication Data

US 2004/0168937 A1 Sep. 2, 2004

Related U.S. Application Data

(63) Continuation of application No. PCT/IE02/00130, filed on Sep. 10, 2002.

(30) Foreign Application Priority Data

| Sep. 10, 2001 | (IE) | ............................................ | 2001/0821 |
| Feb. 8, 2002 | (IE) | ............................................ | 2002/0091 |
| May 28, 2002 | (IE) | ............................................ | 2002/0435 |

(51) Int. Cl.$^7$ .............................................. B65D 85/57
(52) U.S. Cl. .................................... 206/308.1; 206/310
(58) Field of Search ................................ 206/232, 303, 206/307, 308.1–308.3, 309, 310, 387.11; 312/9.47, 9.48, 9.54, 9.55, 9.56, 9.57, 9.64

(56) References Cited

U.S. PATENT DOCUMENTS

| 5,590,768 | A | * | 1/1997 | Hilton et al. | ............. | 206/308.1 |
| 5,690,218 | A | * | 11/1997 | McCamy et al. | ........ | 206/308.1 |
| 5,788,068 | A | | 8/1998 | Fraser et al. | ................. | 206/310 |
| 5,988,375 | A | * | 11/1999 | Chang | ...................... | 206/308.1 |
| 6,164,446 | A | * | 12/2000 | Law | ........................ | 206/308.1 |
| 6,283,281 | B1 | * | 9/2001 | Pandolph et al. | ........ | 206/308.1 |

FOREIGN PATENT DOCUMENTS

| EP | 0671743 A2 | 9/1995 |
| EP | 1100088 A2 | 5/2001 |
| FR | 2753297 | 3/1998 |
| WO | WO00/74057 | 12/2000 |

* cited by examiner

Primary Examiner—Luan K. Bui
(74) Attorney, Agent, or Firm—Jacobson Holman PLLC

(57) ABSTRACT

A DVD case (1) is of integral one-part moulded plastics construction. A retainer (15) has two opposed retainer parts (32) having lips (33) for engagement of a DVD at opposed sides of its central aperture. The DVD is released by the parts (32) being moved closer together. However there is no need for the user to press them directly. He or she simply presses a push-button (20) at the edge of the seat, causing the parts (32) to move together in a simple action caused by an integrally moulded release mechanism (16, 17).

18 Claims, 8 Drawing Sheets

CASE FOR HOLDING A DISC-SHAPED ARTICLE

This is a continuation of PCT/IE02/00130 filed Sep. 10, 2002 and published in English.

FIELD OF THE INVENTION

The invention relates to a case for holding a disc-shaped article such as a DVD or a CD.

PRIOR ART DISCUSSION

U.S. Pat. No. 5,788,068 describes such an apparatus, often referred to as a DVD case. The case has hinged covers, and a retainer in one cover engages with the DVD at its central aperture. The retainer comprises two parts, each on a cantilevered arm. When a user presses the retainer parts down they move towards each other and their lips disengage from the DVD. This arrangement appears to require complex moulding processes because of the requirement for cantilevered arms extending at an angle to the plane of the cover.

French Patent Specification No. 2753297 describes an apparatus having a central retainer for engaging the disc aperture. An elastic arm extends under a disc seat and out to the outer edge of the seat. The arm has a lip which engages the outer edge of a disc. When the end of the arm is pressed down the lip disengages from the outer edge of the disc and releases it. It appears that this arrangement is quite complex and that it may damage recorded surfaces of a disc at its outer edge.

It is also known from our earlier published PCT Patent Specification No. PCT/IE00/00069 to provide an apparatus having a drawer incorporating a disc seat The drawer comprises a button in the handle of the drawer for releasing a disc. Such an apparatus comprises three main parts, namely a back cover, a front cover, and a drawer which slides in the back cover. There are situations where a simpler two-part or one-part arrangement is preferred, as such an arrangement would be less prone to damage and less expensive.

The invention is therefore directed towards providing a case of simple construction with minimum parts, and which allows a user to release a disc without the need for him or her to directly engage the central disc aperture.

SUMMARY OF THE INVENTION

According to the invention, there is provided a case for holding a disc-shaped article of the type having a central aperture, the case comprising:— housing, the housing comprising a seat for holding a disc-shaped article, the seat comprising a central retainer comprising means for engaging an article at its central aperture, a user actuator remote from the retainer, and a release means comprising means for causing the retainer to disengage from a disc upon user operation of the actuator.

In one embodiment, the retainer comprises two opposed retainer parts for engagement with an article at opposed sides of an articles central aperture.

In another embodiment, each retainer part is mounted on an associated arm, and the release means comprises means for causing the arms to move towards each other to release an article.

In a further embodiment, said arms are inner arms and the release means comprises an outer arm connected to each of said inner arms, and the actuator comprises means for pressing the outer arms away from each other, thereby causing the inner arms to move closer together.

In one embodiment, the user actuator comprises a push button connected to the outer arms by splayed links, whereby pressing of the button causes the outer arms to be pressed apart.

In another embodiment, the user actuator is located at an edge of the seat.

In a further embodiment, the release means comprises guide means for guiding movement of the retainer parts substantially in the plane of the seat.

In one embodiment, said guide means comprises a guide arm connected to each retainer part by a hinge and to the seat by a hinge.

In another embodiment, each guide arm is of arcuate shape in plan view, and is located at a lateral side of its associated retainer part.

In a further embodiment, the retainer is on a raised boss of the seat.

In one embodiment, the inner arms conform to the profile of the raised boss.

In another embodiment, the seat further comprises a spring comprising means for biasing an article away from the seat.

In a further embodiment, the spring is adjacent to the retainer.

In one embodiment, there are a plurality of springs mounted around the retainer.

In another embodiment, the spring comprises an integral arm extending upwardly from the seat.

In one embodiment, the push button is cantilevered from a raised boss 22 of the housing.

In another embodiment, the seat is integral with the housing.

In a further embodiment, the seat is integral with a hinged cover of the housing.

DETAILED DESCRIPTION OF THE INVENTION

BRIEF DESCRIPTION OF THE EMBODIMENTS

The invention will be more clearly understood from the following description of some embodiments thereof, given by way of example only with reference to the accompanying drawings in which:—

DESCRIPTION OF THE EMBODIMENTS

Figure 1:
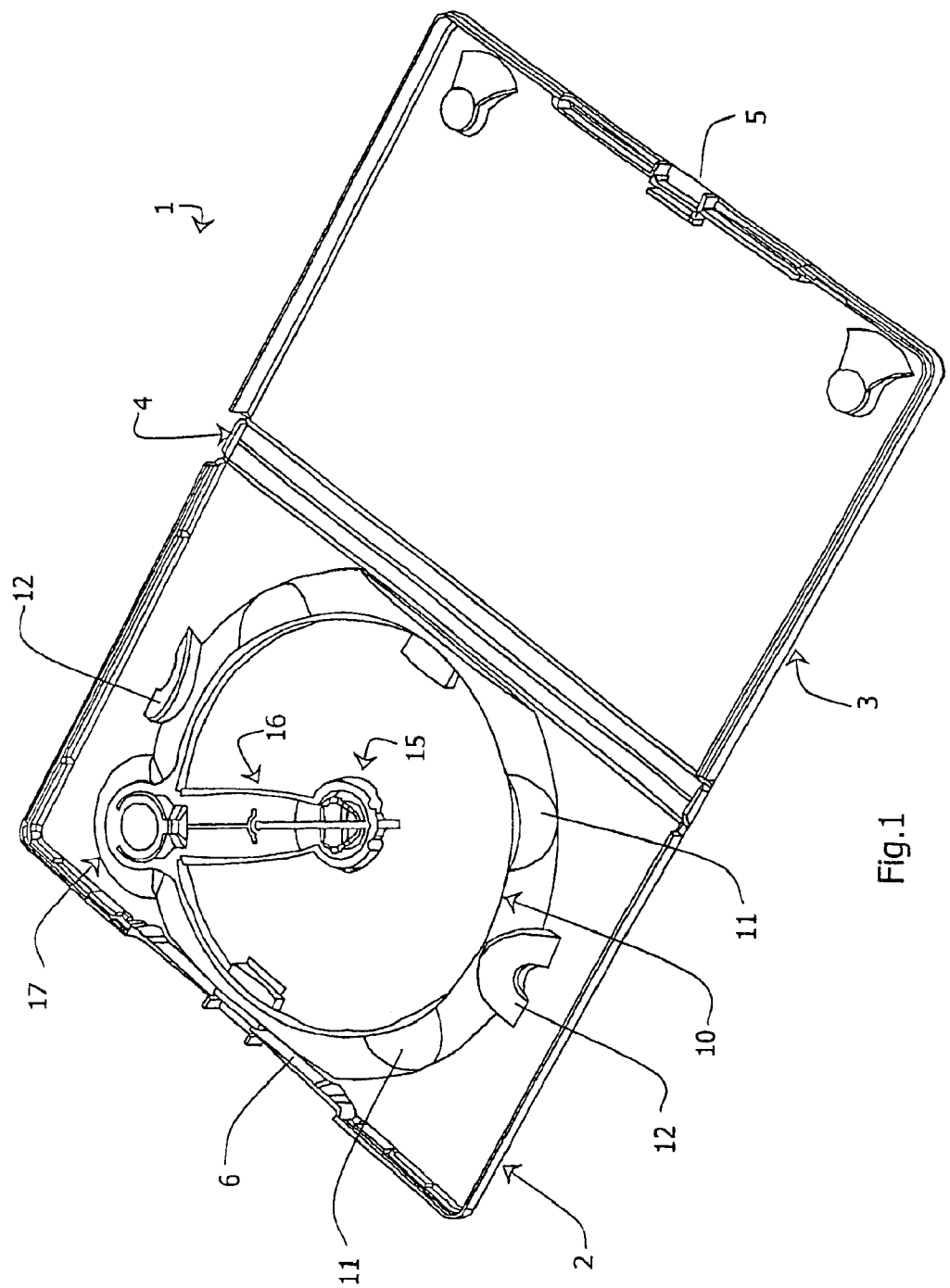
FIG. 1 is a perspective view from above of a case of the invention when open.
Figure 2:
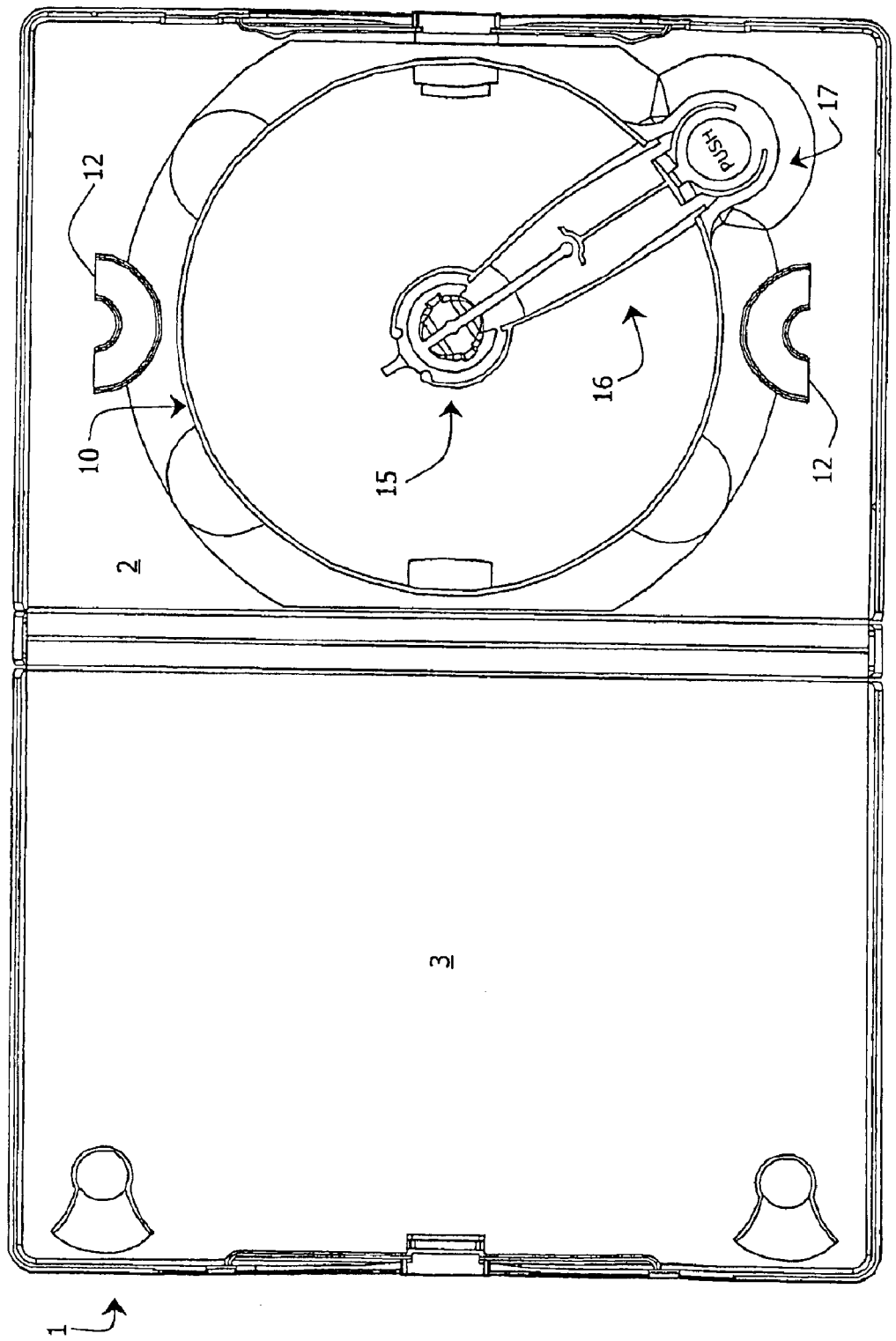
FIG. 2 is a plan view of the case.

Referring to FIGS. 1 and 2 a DVD case 1 of the invention comprises a back cover 2 hinged to a front cover 3 by an integral hinge 4. The covers 2 and 3 and the hinge 4 are of integral moulded plastics construction and thus the case 1 comprises only one moulding. The covers 3 and 2 comprise snap-fitting lock parts 5 and 6 respectively.

The back cover 2 comprises a round seat 10 for receiving and storing a DVD. There are four curved protrusions 11 around the periphery of the seat 10 to help hold a DVD in place in the seat 10, thereby helping to prevent damage to the DVD. Also, the back cover 2 comprises two sloped security tabs 12, one on the top and one on the bottom of the seat 10 as viewed in FIG. 2. The tabs 12 help prevent unauthorised removal of a DVD, for example by a thief in a shop. If an unauthorised attempt is made to slide a DVD from the seat 10 it presses against one of the tabs 12, causing it to open more fully and press against the front cover 3. These features are thus of benefit at combatting the problem of theft in shops by sliding a DVD from its seat and out of the case and leaving the case (with its security tag) behind in the shop.

The back cover 2 also comprises an integral disc retainer and release mechanism comprising a retainer 15, a release arm 16, and a release actuator 17. These are illustrated in more detail in FIGS. 3, 4, and 5. For clarity, the gaps between parts of the seat 10 are indicated by hatching in FIG. 3.

Figure 3:
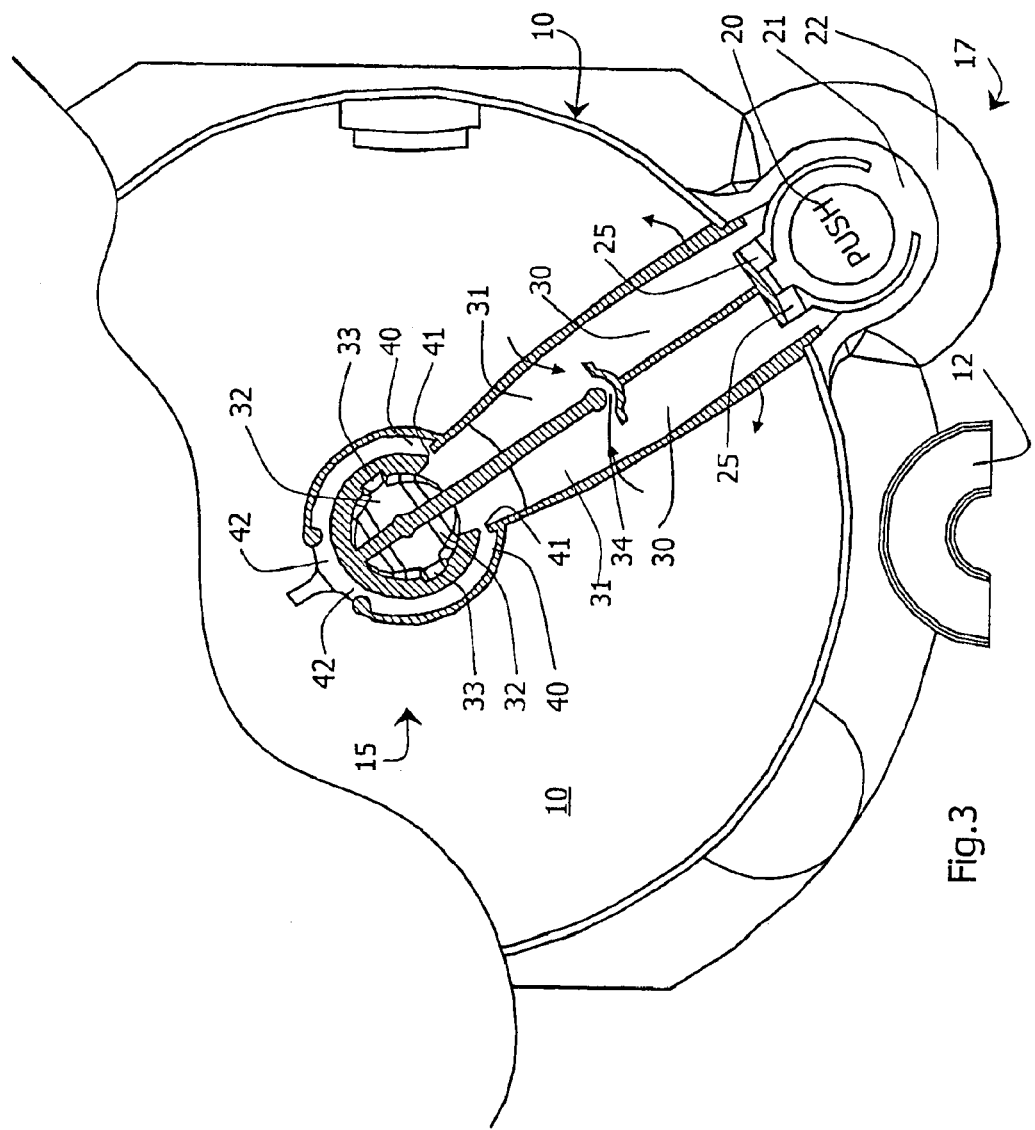
FIG. 3 is a larger-scale more detailed plan view showing a release mechanism more clearly.
Figure 4:
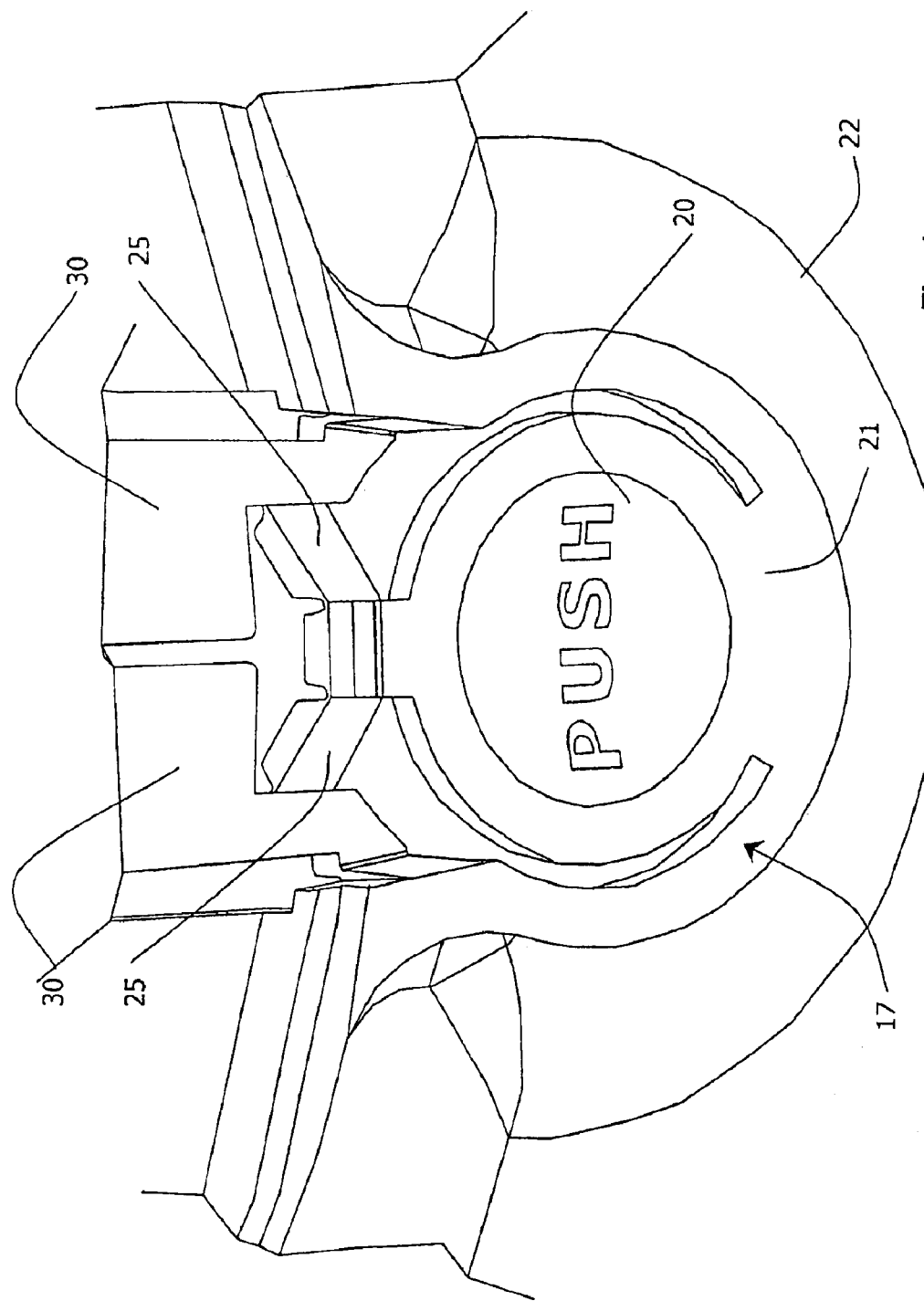
FIG. 4 is a perspective view showing a button of the release mechanism in more detail.
Figure 5:
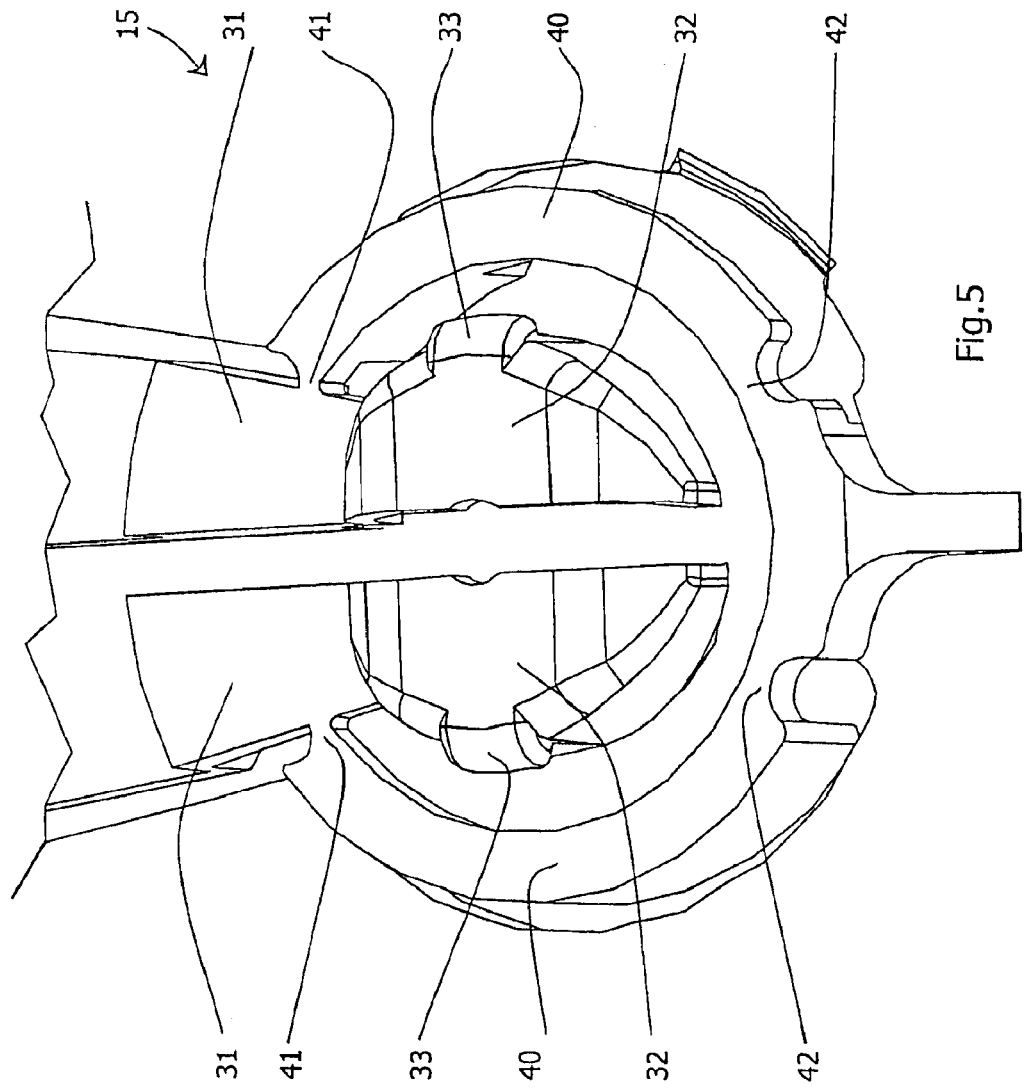
FIG. 5 is a perspective view showing a retainer of the mechanism in more detail.

Referring to FIGS. 3, 4, and 5, the release actuator 17 comprises a cantilevered button 20 extending from a portion of plastics material 21 acting as a hinge connecting the button 20 to a raised boss 22. Because it extends from the boss 22, the button 20 is substantially parallel with and elevated from the main body of the back cover 2. A pair of splayed links or wings 25 connect the inner end of the button 20 to a pair of radially-extending outer arms 30 which are in the plane of the main body of the back cover 2. The outer arms 30 are integral with a pair of radially-extending inner arms 31, which are integral with a pair of opposed DVD retainer parts 32 at their ends.

Each retainer part 32 comprises a lip 33 for snap-fitting engagement with the edge of a DVD at its central aperture. The configuration of the inner arms 31 is such as to provide a hinge joint 34 about which the inner arms 31 are biased away from each other if they are forced together from a natural home position (shown in FIG. 3). User pressing of a DVD into the seat 10 causes the retainer parts 32 to be pressed towards each other by virtue of their upper sloped surfaces until the lips 33 engage the DVD by snap-fitting over the edge. In this position the retainer parts 32 (and the inner arms 31) are biased away from each other towards the home position, and thus they securely grip the DVD. The ends of the inner arms 31 are guided by crescent-shaped guide arms 40, each guide arm 40 being connected to an inner arm 31 at a hinge point 41 and to the main body of the seat 10 at a hinge point 42. The purpose of the guide arms 40 is to guide movement of the inner arms 31 (and hence the retainer parts 32) in the plane of the seat 10 and to provide additional strength for gripping a DVD.

Release of a DVD from the seat 10 is very simple and does not require the user to touch the DVD. He or she simply presses the button 20, causing the wings 25 to become more splayed out. This causes the outer arms 30 to move apart, causing the inner arms 31 to move closer together by rotation to a small extent about the hinge joint 34. This movement is sufficient to cause the DVD to be released from the lips 33 and thus to "pop" upwards. This movement of the arms 30 and 31 is indicated by the arrows of FIG. 3.

It will therefore be appreciated that the invention provides for release of a DVD without the need to touch the DVD itself. This reduces the problem at present of users sometimes damaging a disc at its centre by, for example, pulling a disc from the retainer. Simply pushing a button located beside the seat is intuitive for a user.

It is also a very simple operation—the user only needing, to press the button 20. Furthermore, the DVD is not gripped around its periphery and there is little chance of it being damaged. This has been achieved in a case having only one integrally moulded part, and so manufacturing costs are low and there is little risk of damage to the case.

Figure 6:
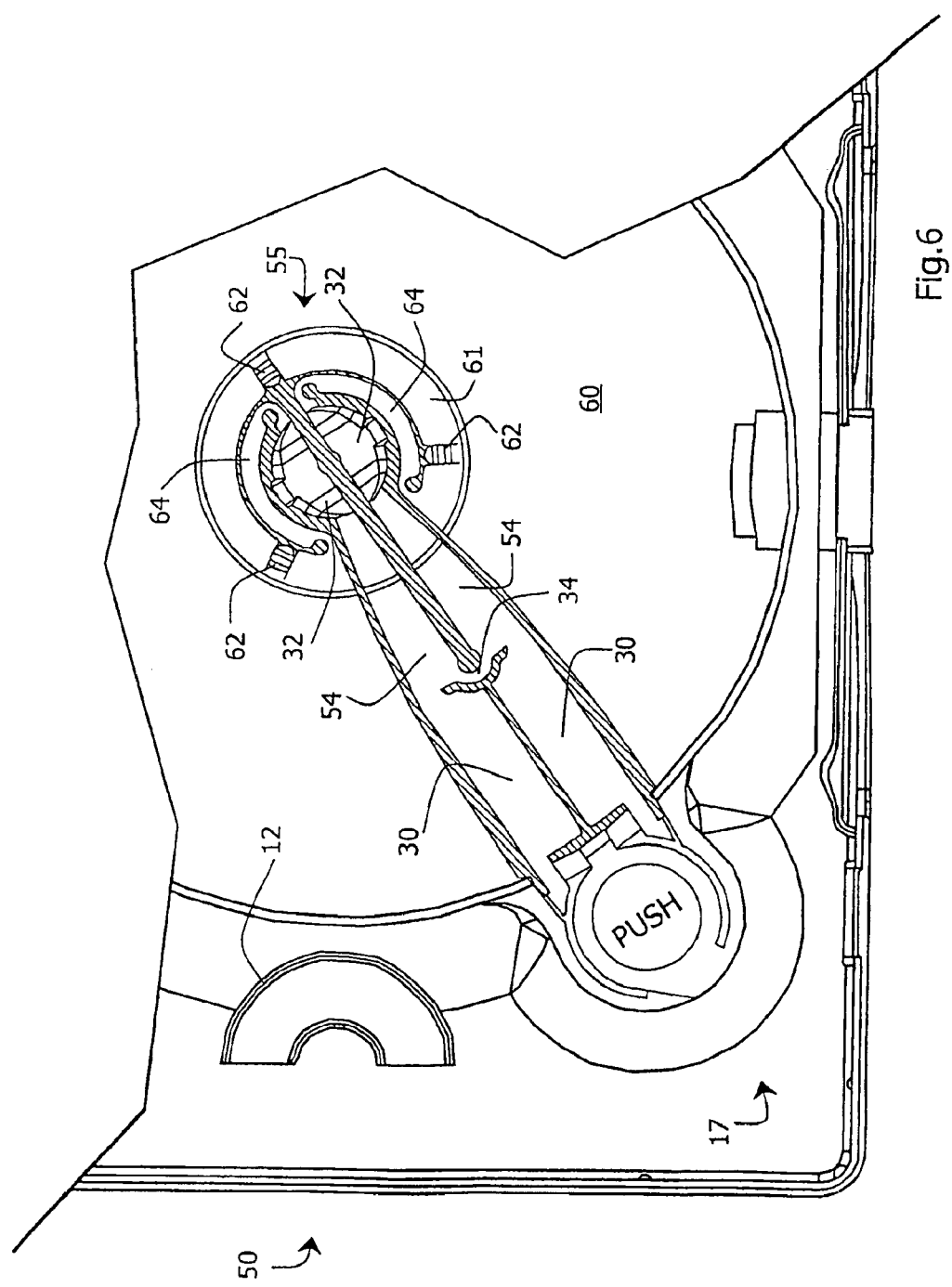
FIG. 6 is a plan view of an alternative retainer of a case of another embodiment.
Figure 7:
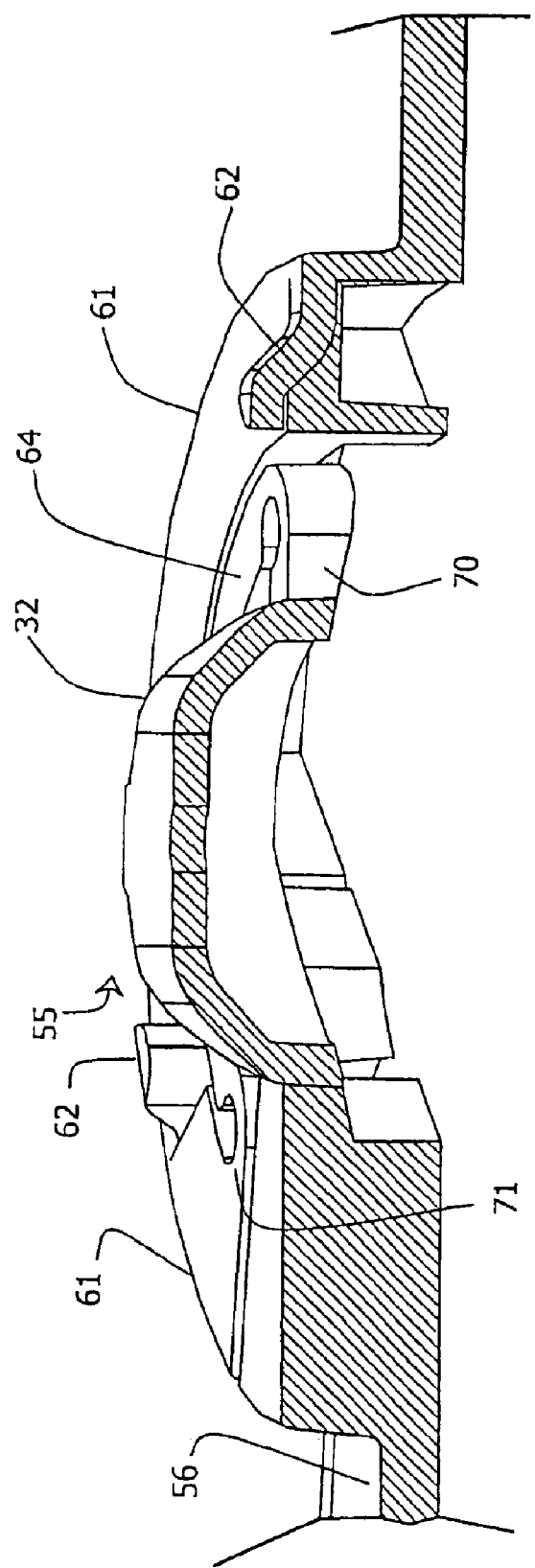
FIG. 7 is a perspective partly cut-away view showing the retainer in more detail.

Referring to FIGS. 6 and 7 a portion of an alternative back cover 50 is illustrated. Parts similar to those illustrated in FIGS. 1 to 5 are illustrated by the same reference numerals. In this embodiment inner arms 54 are connected to a retainer 55 in a seat 60.

The retainer 55 is elevated in the centre of the seat 60 on a raised boss 61. Three integral spring arms 62 are equally spaced around the boss 61 to assist in the "popping-up" motion of the disc when it is released by the retainer parts 32. Also the cut-out pattern of the material forms arcuate guide arms 64 which are connected in the opposite sense to the arms 40 of FIGS. 1 to 5. They are connected at their inner ends (furthest from the push button) to the retainers 32 at hinge points 70, and at their outer ends to the main body of the seat 60 at the boss 61 at hinge points 71. This is best illustrated in FIG. 7. It has been found that this arrangement of guide arms is particularly effective when the ends of the inner arms 54 are ramped up for conformity with the raised boss 61.

Figure 8:
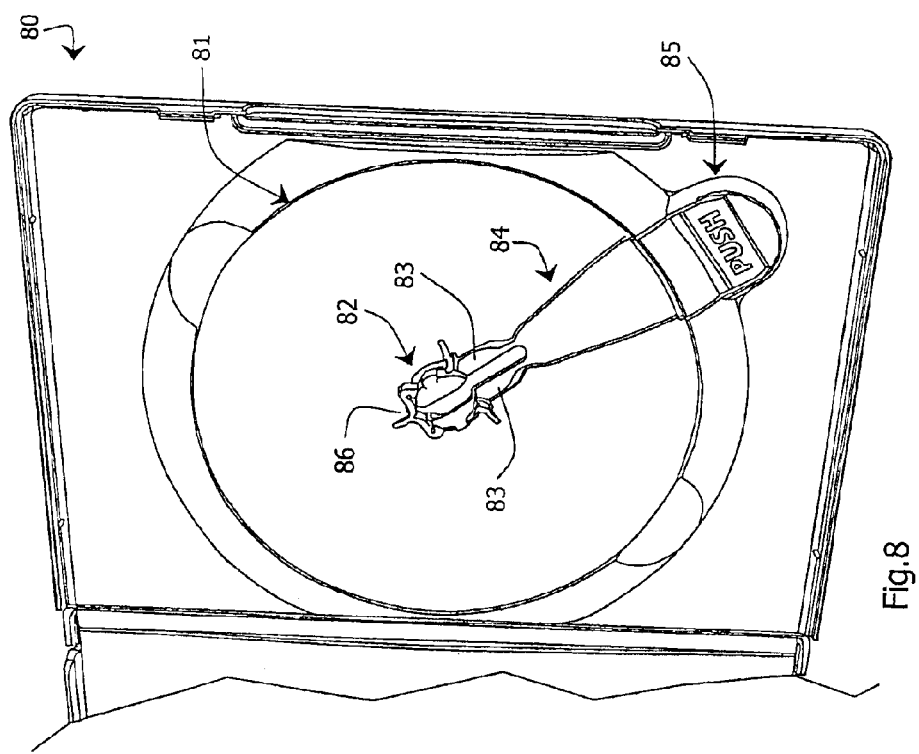
FIG. 8 is a perspective view of part of a further case of the invention.

Referring to FIG. 8 an alternative case 80 is shown. The case 80 comprises a seat 81 having a two-part retainer 82 of broadly similar construction to that of the case 1. The retainer parts are on inner arms 83, in turn integral with a single outer arm 84. The outer arm 84 is integral with a push button 85. The push button 85 is configured to pull the outer arm 84 radially outwardly when it is pressed. In this embodiment the retainer parts are caused to mover together by:—.

a user pressing the button 85, causing the outer arm 84 to move radially outwardly, causing the inner arms 83 to move together by virtue of a resilient anchorage 86 at the far side of the retainer.

The invention is not limited to the embodiments described but may be varied in construction and detail. For example, it is envisage that the seat and the retainer may not be integral with the housing (cover) and may instead be in an insert secured to a cover. It is also envisaged that both covers may comprise a seat and retainer for storage of two or more articles.

What is claimed is:

1. A case for holding a disc-shaped article of the type having a central aperture, the case comprising:

housing, the housing comprising a seat for holding a disc-shaped article, the seat comprising a central retainer comprising means for engaging an article at its central aperture, a user actuator remote from the retainer, and a release means comprising means for causing the retainer to disengage from a disc upon user operation of the actuator.

2. A case as claimed in claim 1, wherein the retainer comprises two opposed retainer parts for engagement with an article at opposed sides of an articles central aperture.

3. A case as claimed in claim 2, wherein each retainer part is mounted on an associated arm, and the release means comprises means for causing the arms to move towards each other to release an article.

4. A case as claimed in claim 3, wherein said arms are inner arms and the release means comprises an outer arm connected to each of said inner arms, and the actuator comprises means for pressing the outer arms away from each other, thereby causing the inner arms to move closer together.

5. A case as claimed in claim 4, wherein the user actuator comprises a push button connected to the outer arms by splayed links, whereby pressing of the button causes the outer arms to be pressed apart.

6. A case as claimed in claim 1, wherein the user actuator is located at an edge of the seat.

7. A case as claimed in claim 2, wherein the release means comprises guide means for guiding movement of the retainer parts substantially in the plane of the seat.

8. A case as claimed in claim 7, wherein said guide means comprises a guide arm connected to each retainer part by a hinge and to the seat by a hinge.

9. A case as claimed in claim 8, wherein each guide arm is of arcuate shape in plan view, and is located at a lateral side of its associated retainer part.

10. A case as claimed in claim 1, wherein the retainer is on a raised boss of the seat.

11. A case as claimed in claim 4, wherein the inner arms conform to the profile of the raised boss.

12. A case as claimed in claim 1, wherein the seat further comprises a spring comprising means for biasing an article away from the seat.

13. A case as claimed in claim 12, wherein the spring is adjacent to the retainer.

14. A case as claimed in claim 13, wherein there are a plurality of springs mounted around the retainer.

15. A case as claimed in claim 12, wherein the spring comprises an integral arm extending upwardly from the seat.

16. A case as claimed in claim 5, wherein the push button is cantilevered from a raised boss of the housing.

17. A case as claimed in claim 1, wherein the seat is integral with the housing.

18. A case as claimed in claim 17, wherein the seat is integral with a hinged cover of the housing.

* * * * *